Jan. 11, 1966   R. S. PATCH   3,228,574
SERVING GATE FOR DISPENSING FREEZER
Filed Dec. 13, 1963
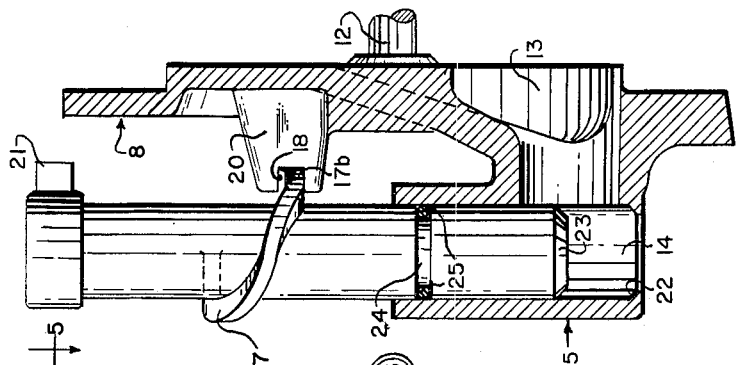
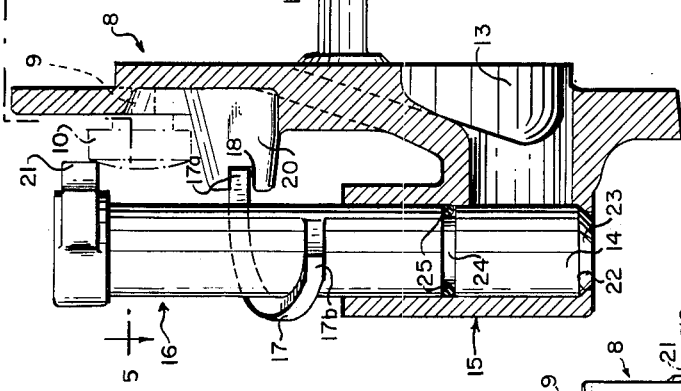
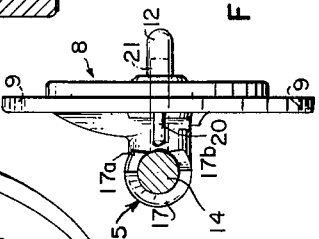
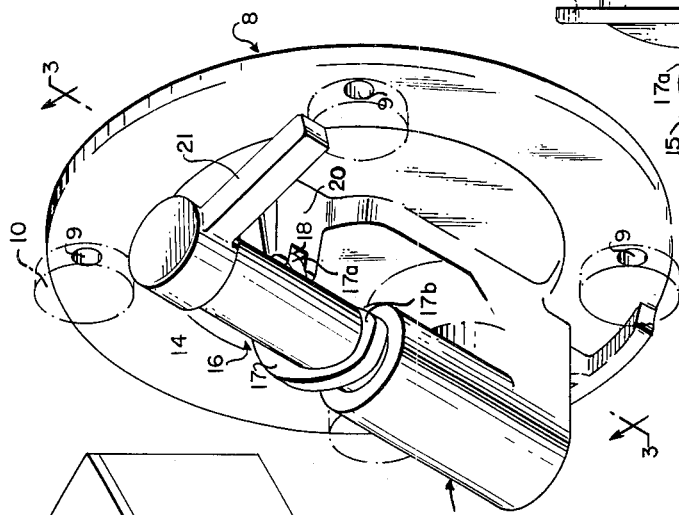
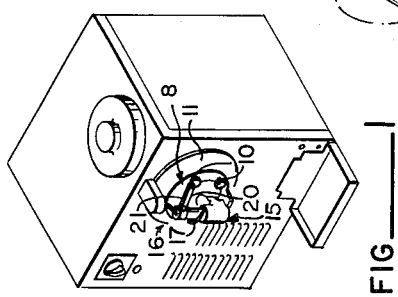
ROBERT S. PATCH
INVENTOR
BY *Seed & Berry*
ATTORNEYS

United States Patent Office 3,228,574
Patented Jan. 11, 1966

3,228,574
SERVING GATE FOR DISPENSING FREEZER
Robert S. Patch, Bainbridge Island, Wash., assignor to Sweden Freezer Manufacturing Co., Seattle, Wash., a corporation of Washington
Filed Dec. 13, 1963, Ser. No. 330,324
8 Claims. (Cl. 222—559)

The present invention relates to serving gates for dispensing freezers, particularly those for soft ice cream or the like of the type in which the frozen product is dispensed through a cover at the front of the freezing cylinder.

The invention aims to provide an improved cover-serving gate assembly of unusually simple and economical construction, which is easy to install and operate, can be readily cleaned, and minimizes thermal losses from the related freezing cylinder.

Other more particular objects and advantages of the invention, will, with the foregoing, appear and be understood in the course of the following description and claims, the invention consisting in the novel construction and in the adaptation and combination of parts hereinafter described.

In the accompanying drawings:

FIG. 1 is a front perspective view of a typical dispensing freezer on which the present invention is used.

FIG. 2 is a front perspective view of the cover-serving gate assembly embodying the invention.

FIGS. 3 and 4 are vertical sectional views of the assembly with the serving gate illustrated in closed and open positions, respectively; and FIG. 5 is a horizontal sectional view taken as indicated by the line 5—5 of FIG. 3, but with the gate handle turned to gate removing position and shown in phantom.

Referring to the drawings, 8 designates the circular cover plate for the front of a freezing cylinder in a dispensing freezer of the type, for example, shown in U.S. Patent No. 2,924,951. Marginal openings 9 are provided in the cover plate to receive thumb screws 10 or other fastening means for holding the cover plate and a related gasket against an insulating collar 11 which circumscribes the open front end of a freezing cylinder. Working in the latter is a removable dasher assembly which presents a round center opening at its forward end into which there is received a journal pin 12 projecting rearwardly from the center of the cover plate 8. At its aft end the dasher assembly is driven by a drive shaft extending through the rear end of the freezing cylinder.

As part of its operating function, the dasher assembly urges frozen product toward the front of the freezing cylinder to feed it into a discharge passage 13 presented by the cover plate. This discharge passage intersects a vertical throughbore 14 formed in a nose 15 projecting forwardly from the cover plate. Movable endwise in this bore between a lower closed position and an upper open position is a cylindrical plunger valve 16 functioning as a serving gate for the related freezing cylinder. To this extent the afore described structure is well known in the dispensing freezer art as shown in Patent No. 2,924,951, for example, and hence the freezing cylinder and dasher assemblies have not been shown in the instant case.

By the present invention the serving gate 16 is formed with a spiral land 17 which extends about a half turn around the shank of the gate and terminates at generally flat upper and lower portions 17a–17b. When the serving gate is in operating position the land 17 extends radially of the gate into a cooperating guide slot 18 which is presented at the forward end of a lug 20 in turn projecting forwardly above the nose 15 as an integral part of the cover plate. At its upper end, spaced above the land 17, the serving gate presents a radially extending handle 21 for manually turning the gate.

The handle 21 is preferably directed away from the center of the land, i.e., the handle is aimed rearwardly toward the lug 20 when the land is free of the guide slot 18 as shown in FIG. 5. This latter position represents the removal position of the gate since the gate is then free to be lifted endwise out of the bore 14 in the nose 15 for cleaning. Of significance in this regard is the fact that the handle 21 is purposely spaced above the lower terminal portion 17b of the land such that when the latter is at the same level as the top of the guide slot 18 the handle can clear the upper edge of the cover plate. Furthermore, the length of the handle is such that when the lower terminal portion 17b is within the guide slot the handle can reach the vertical plane occupied by the back face of the cover plate. By this arrangement the handle will engage as a stop the insulating collar 11 to which the cover plate is secured when in operative position, or a related thumb screw 10, before the land 17 can be turned to the removal position whereat the land is free of the guide slot.

The lower end portion of the bore 14 is formed with a frustro-conical seat 22 with which the bottom end of the serving gate is beveled to mate at 23. At a distance above the bevel 23 in excess of the distance between the seat 22 and the upper edge of the intersection between the discharge passage 13 and bore 14, the serving gate has a circumferential groove 24 for receiving an elastic O-ring 25 to seal the upper end of the bore 14.

As part of the present invention the cover plate 8 and serving gate 16 are molded from a suitable thermally insulating plastic material so as to minimize thermal losses from the freezing cylinder and to deter objectionable frosting of the front face of the cover plate, and to insure that the serving gate cannot be frozen shut during normal operation of the dispensing freezer.

To install the serving gate its lower end is lowered into the upper end of the bore 14 with the handle 21 overlying the cover plate. Lowering is continued until the handle reaches and engages the upper edge of the cover plate whereupon the lower terminal portion 17b of the land 17 is offset from the guide slot 18, but is at the same level thereas. The handle is then turned counterclockwise, as viewed from above, causing the lower terminal portion 17b to enter the guide slot. At this point the free end of the handle is swung forwardly at least as far as the plane of the back face of the cover plate so that the cover plate and serving gate can be installed as an assembly at the front of the freezing cylinder by application of fastening means through the openings 11. After such installation the serving gate cannot be removed separately because the handle 21 will engage the portion of the freeze at the rim of the cover plate before the lower portion 17b of the land 17 can clear the guide slot 18.

To close the serving gate it is only necessary to turn the handle 21 counterclockwise from the left to the right as viewed from the front. During this turning movement the gate begins to partake of downward movement when the upper face of the spirial land 17 engages the upper edge of the guide slot and downward travel continues until the upper face of the upper terminal portion 17a of the land comes into engagement with the upper edge of the guide slot. At this time the lower beveled end portion 23 of the gate is firmly resting against the seat 22. Further counterclockwise turning of the handle, while not advancing the gate downwardly, does serve to wipe the lower end of the gate against the seat 22 thereby assuring clean cutoff of the dispensed product. The amount of such wiping action is limited by engagement of the front wall of the cover plate 8, or of a thumb screw 10, by the free end of the handle 21 as shown in FIGS. 2 and 3. It will now be appreciated that the vertical distance from the upper face of the upper terminal land portion 17a to the beveled bottom portion 23 of the gate should correspond to the vertical distance from the upper edge of the guide slot 18 to the seat 22.

Similarly, to open the serving gate the operator merely manually swings the handle 21 clockwise from the right to the left. During this gate-opening movement the lower face of the land 17 is brought into engagement with the lower edge of the guide slot 18 and rides thereagainst causing the gate to lift according to the preselected lead of the spiral of the land.

After the cover plate and serving gate have been removed together from the dispensing freezer for cleaning at the close of operations, the gate is swung until the handle 21 again overlies the upper rim of the cover plate. The gate can then be lifted completely out of the bore 14 so that the parts are free to be individually thoroughly cleaned.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What is claimed is:

1. In combination, a removable cover for a dispenser having a nose with circular discharge bore therethrough, a serving gate movable endwise in said bore between dispensing and closed positions, a spiral land on said gate, a guide slot provided by said cover in spaced relation to said bore, said guide slot being considerably shorter than said land and means for selectively turning said gate whereby the gate partakes of endwise movement in said bore between said positions by working of said land in said guide slot, said spiral land covering less than a full revolution of said gate and having a circumferential gap between its terminal ends whereby said land is free of said guide slot for endwise removal of the gate from said cover when said slot is in said gap.

2. The structure of claim 1 in which said gate has a handle projecting radially therefrom at a position spaced directly endwise from said gap and is free of engagement with said cover when said handle is directed in the general direction of said slot.

3. The structure of claim 1 in which said gate has a handle projecting radially therefrom arranged to engage said cover as a stop when said gate is in its said closed position.

4. The structure of claim 1 in which said gate has a handle projecting radially therefrom arranged to engage said cover as a stop when said gate is in its said closed position, and arranged to be free of engagement with said cover when the gate is in its said open position.

5. The structure of claim 1 in which said gate has a handle projecting radially therefrom arranged to engage said cover as a stop when said gate is in its said closed position, and arranged to have its free end in the plane of the back face of said cover when the gate is in its said open position.

6. The structure of claim 1 in which said cover has a back face parallel to said bore and said gate has a handle projecting radially therefrom at a position spaced directly endwise from said gap and spaced further from said bore than said land is spaced, said handle being longer than the distance from said gate to said back face and being located to engage the front of said cover when said gate is in its said closed position and to have its free end reach the plane occupied by said back face of the cover when said gate is in its open position whereby said gate can be removed when and only when said cover is removed.

7. In combination, a dispenser having a circular discharge bore, a serving gate movable endwise in said bore between dispensing and closed positions, a spiral land on said gate, a guide slot outside of said bore provided by said dispenser and receiving said land, said guide slot being considerably shorter than said land, said spiral land covering less than a full revolution of said gate and having a circumferential gap between its terminal ends whereby said land is free of said guide slot for endwise removal of the gate from said dispenser when said slot is in said gap, and said spiral land having a non-spiral terminal end portion on the respective terminal and which occupies said guide slot when said gate is in its closed position, and means for selectively turning said gate whereby the gate partakes of endwise movement in said bore between said positions by working of said land in said guide slot.

8. The structure of claim 7 in which said spiral land also has a non-spiral end portion at its other terminal end which occupies said guide slot when said gate is in its dispensing position.

References Cited by the Examiner

UNITED STATES PATENTS

| | | | |
|---|---|---|---|
| 491,349 | 2/1893 | Hardoin | 222—549 X |
| 643,075 | 2/1900 | Van Brocklin | 251—324 |
| 674,790 | 5/1901 | Mullaney | 251—274 |
| 781,571 | 12/1905 | Thomas | 85—1 |
| 814,605 | 3/1906 | Holly | 222—552 X |
| 1,465,148 | 8/1923 | Rosenberg | 85—47 |
| 1,681,981 | 8/1928 | Gilbert | 251—215 |
| 2,118,809 | 5/1938 | Cornell | 251—218 X |
| 3,052,381 | 9/1962 | Carpigiani | 62—342 |

FOREIGN PATENTS

| | | |
|---|---|---|
| 15,057 | 6/1911 | Great Britain. |
| 611,020 | 10/1960 | Italy. |

LOUIS J. DEMBO, *Primary Examiner.*

RAPHAEL M. LUPO, *Examiner.*